US010920717B1

(12) United States Patent
Owens et al.

(10) Patent No.: US 10,920,717 B1
(45) Date of Patent: Feb. 16, 2021

(54) HYDROGEN PRODUCING SYSTEM AND DEVICE FOR IMPROVING FUEL EFFICIENCY AND REDUCING EMISSIONS OF INTERNAL COMBUSTION AND/OR DIESEL ENGINES (71) Applicant: Donald Owens, Temecula, CA (US)

(72) Inventors: Donald Owens, Temecula, CA (US); Webb Beeman, Temecula, CA (US)

(73) Assignee: Donald Owens, Temecula, CA (US)

( * ) Notice: Subject to any disclaimer, the term of this patent is extended or adjusted under 35 U.S.C. 154(b) by 0 days.

(21) Appl. No.: 17/047,041

(22) PCT Filed: Dec. 18, 2019

(86) PCT No.: PCT/US2019/067182
§ 371 (c)(1),
(2) Date: Oct. 12, 2020

(87) PCT Pub. No.: WO2020/132073
PCT Pub. Date: Jun. 25, 2020

Related U.S. Application Data (60) Provisional application No. 62/782,202, filed on Dec. 19, 2018.

(51) Int. Cl.
F02M 25/12 (2006.01)
B60R 16/03 (2006.01)
F02M 35/10 (2006.01)
F02D 41/00 (2006.01)
C25B 1/04 (2021.01)
C25B 9/10 (2006.01)
(Continued)

(52) U.S. Cl.
CPC .............. F02M 25/12 (2013.01); B60R 16/03 (2013.01); C25B 1/04 (2013.01); C25B 9/10 (2013.01); C25B 15/02 (2013.01); F02D 21/06 (2013.01); F02D 41/0025 (2013.01); F02M 35/10209 (2013.01); F02D 2200/024 (2013.01)

(58) Field of Classification Search
CPC .............. F02M 25/12; F02M 35/10209; F02D 41/0025; F02D 21/06; F02D 2200/024; B60R 16/03; C25B 15/02; C25B 9/10; C25B 1/04
See application file for complete search history.

(56) References Cited

U.S. PATENT DOCUMENTS

2012/0237843 A1  9/2012  Paganelli
2016/0024666 A1* 1/2016  Bahar ..................... C25B 9/18
205/338
(Continued)

OTHER PUBLICATIONS

PCT/US2019/067182 International Search Report and Written Opinion dated Mar. 4, 2020.

Primary Examiner — Jacob M Amick
Assistant Examiner — Charles Brauch
(74) Attorney, Agent, or Firm — Wagenknecht IP Law Group, PC (57) ABSTRACT Provided herein is an optimizable hydrogen generation system for producing and injecting hydrogen gas as a fuel supplement into the air intake of internal combustion and/or diesel engines. Hydrogen gas ($H_2$) and oxygen gas ($O_2$) are produced with one or more pairs of cells to adjust the amount of hydrogen gas supplied to the engine, while the oxygen gas is vented to the atmosphere.

27 Claims, 10 Drawing Sheets (51) Int. Cl.
*C25B 15/02* (2021.01)
*F02D 21/06* (2006.01)

(56) References Cited

U.S. PATENT DOCUMENTS

2017/0159556 A1  6/2017  Owens
2017/0321331 A1  11/2017 Mitsushima et al.
2018/0327917 A1  11/2018 Beachy et al.

* cited by examiner

HYDROGEN PRODUCING SYSTEM AND DEVICE FOR IMPROVING FUEL EFFICIENCY AND REDUCING EMISSIONS OF INTERNAL COMBUSTION AND/OR DIESEL ENGINES

CROSS REFERENCE TO RELATED APPLICATION(S)

This application claims the benefit of priority under 35 U.S.C. § 119(e) of U.S. Ser. No. 62/782,202, filed Dec. 19, 2018, the entire content of which is incorporated herein by reference.

BACKGROUND OF THE INVENTION

Field of the Invention

The present invention relates generally to hydrogen generation devices and more particularly, to a portable hydrogen supplemental system that can be used with internal combustion and/or diesel engines of all sizes to reduce emissions and increase fuel efficiency.

Background Information

Exhaust emissions are becoming an issue due to environmental concerns. Internal combustion engines are inherently inefficient. In an internal combustion engine, 100% of the fuel that goes into the combustion chamber is not burned during the combustion process for neither gasoline nor diesel engines. The exhaust for all internal combustion engines includes carbon monoxide, unburned hydrocarbons and oxides of nitrogen. For gasoline engines, a catalytic converter is used to convert some of the toxic by-products of the combustion to less toxic substances by way of catalyzed chemical reactions. The combustion process in diesel engines is different from that of gasoline engines. While gasoline engines use a spark plug to initiate combustion of gasoline, diesel engines rely upon compression to initiate combustion of the diesel fuel. Because of the difference in the combustion process of diesel engines, the exhaust from diesel engines also contains a mixture of gases and very small particles that can create a health hazard when not properly controlled. Diesel particulate matter is a part of a complex mixture that makes up diesel exhaust. It should be noted, however, that even though gasoline combustion differs from diesel combustion, particulate matter is also created and is a complex mixture that makes up gasoline exhaust.

Diesel exhaust is composed of two phases either gas or particle and both phases contribute to the risk. The gas phase is composed of many of the urban hazardous air pollutants, such as acetaldehyde, acrolein, benzene, 1,3-butadiene, formaldehyde and polycyclic aromatic hydrocarbons. The particle phase also has many different types of particles that can be classified by size or composition. The size of diesel particulates that are of greatest health concern are those that are in the categories of fine, and ultrafine particles. The composition of these fine and ultrafine particles may be composed of elemental carbon with adsorbed compounds such as organic compounds, sulfate, nitrate, metals and other trace elements. Diesel exhaust is emitted from a broad range of diesel engines; the on-road diesel engines of trucks, buses and cars and the off-road diesel engines that include locomotives, marine vessels and heavy-duty equipment.

The current technology to reduce particulate matter is based on either incorporation of particulate exhaust filters or use of exhaust systems that attempt to burn the particulate matter once it reaches the exhaust. The use of exhaust filters may require active monitoring to determine whether the exhaust filters have reached their maximum capacity. Further, the exhaust systems that burn the particulate matter are typically complex and expensive systems.

Hydrogen co-combustion has been proven to be effective to reduce emissions in internal combustion and/or diesel engines. There are a number of devices on the market that create HHO gas, otherwise known as Brown's gas, which is used as a supplement to gasoline and diesel engines to reduce exhaust emissions. HHO gas consists of two parts hydrogen to one part oxygen. These devices typically include an electrolyzer that decomposes electrolytic water into oxy-hydrogen gas using an electrolyte, such as potassium hydroxide, or baking soda.

However, there has never been a system that can be used for all internal combustion and/or diesel engines no matter what the engine size. The amount of hydrogen required to reduce emissions and improve efficiency varies with the size of the engine. For example, the hydrogen required to reduce the emissions in a 1.6 liter engine of a small diesel vehicle would differ significantly from the hydrogen required for a 6.5 liter diesel engine of a school bus or Military Humvee, or a 50-100 liter engine that may be used for generators, ships, helicopters, etc. Therefore, a need exists for a portable hydrogen supplemental system that can be used with internal combustion and/or diesel engines of all sizes for reduced emissions and increased fuel efficiency.

SUMMARY OF THE INVENTION

The present invention is based on a finding that an electrolyzer system can be formed using a modular approach, where the electrolyzer system includes one or more cartridges, depending on the hydrogen supplementation needs of the internal combustion and/or diesel engine to which it is connected.

Accordingly, in one aspect, the invention provides a portable hydrogen supplemental system for supplying hydrogen gas to an internal combustion or diesel engine. The system includes a pair of cells, where each cell includes an oxygen substrate comprising an inner surface, an outer surface, and a plurality of through-holes; a first diffusion layer disposed on the inner surface of the oxygen substrate and in fluid communication with the plurality of through-holes; an anode disposed on the first diffusion layer; a membrane comprising a first surface coated with a first catalyst and a second surface, wherein the first surface of the membrane is disposed on the anode; a cathode disposed on the second surface of the membrane; a second diffusion layer disposed on the cathode; a hydrogen substrate comprising an inner surface, an outer surface, and an output port configured to flow gas therethrough, the inner surface being disposed on the second diffusion layer; and a spacer disposed on the outer surface of the oxygen substrate. In various embodiments, the outer surfaces of the oxygen substrates are sealingly attached to one another, thereby forming a reservoir with the spacer, the reservoir being configured to hold water, supply the water into each cell and vent oxygen out of each cell, wherein the anode of each cell are electrically bonded to one another, and wherein the cathode of each cell are electrically bonded to one another. In various embodiments, the pair of cells of the system may be mounted in rack configured for mounting the system in a vehicle having an internal combustion engine or a diesel engine.

In various embodiments, the system includes a power supply in electrical communication with the anode and cathode, wherein each cell, when supplied with power from the power supply, produces hydrogen gas and oxygen gas from the water, and wherein the hydrogen gas exits the output port. In various embodiments, the membrane may be a selectively permeable membrane, such as an ion exchange membrane. In various embodiments, the second surface of the membrane is coated with a second catalyst, which may be the same or different from the first catalyst. In various embodiments, the first and second catalysts are independently selected from the group consisting of platinum black and iridium ruthenium oxide.

In various embodiments, each of the first and second diffusion layers may be formed from a non-conductive material, such as a woven polypropylene mesh. In various embodiments, the first diffusion layer may be configured to apply tensional force to the oxygen substrate and the anode, and the second diffusion layer may be configured to apply tensional force to hydrogen substrate and the cathode. In various embodiments, each of the anode and cathode may be formed from a woven conductive mesh, such as a stainless-steel mesh. In various embodiments, the spacer may be formed on the outer surface of the oxygen substrate as a single unit.

In various embodiments, the output port of each of cell is configured to flow hydrogen gas to an intake manifold of an internal combustion or diesel engine. In various embodiments, each cell further includes a frame disposed on the outer surface of each hydrogen substrate, each frame being configured to sealingly attach the pair of cells to one another.

The system may further include a collector configured to separate water from collected hydrogen gas. In various embodiments, the collector includes an input port in fluid communication with the output port of each of cell, an output port configured to flow hydrogen gas to an intake manifold of an internal combustion or diesel engine, and a liquid port configured to flow separated water therefrom. In various embodiments, the collector also includes a boot disposed within a housing, the boot being in fluid communication with the input port and the output port, a chamber separated from the boot and configured to flow water through the liquid port, a valve disposed within the boot, the valve being configured to flow water into the chamber, and a float disposed within the boot and fixedly attached to the valve, wherein the float is configured to open the valve to flow separated water therethrough. In various embodiments, the system also includes a filter in fluid communication with the liquid port and configured to filter impurities from the separated water. In various embodiments, one or both of the collector and filter are disposed in a tank, the tank comprising an input port and an output port and being configured to supply fluid to the reservoir.

The system may further include a pump disposed between the output port of the tank and the reservoir, the pump being configured to pump fluid from the tank to the reservoir. In various embodiments, the system may also include a sensor disposed in the tank and in electrical communication with the pump, the sensor being configured to supply power to the pump when the tank receives a predetermined amount of water. In various embodiments, the system may also include a sensor disposed in the reservoir and in electrical communication with the pump, the sensor being configured to supply power to the pump when water in the reservoir reaches a predetermined level.

The system may also include one or more additional pairs of cells, wherein the reservoir of each pair are in fluid communication with one another, the output ports of each hydrogen substrate are in fluid communication with one another, the cathodes of each pair of cells are in electrical communication with one another, and the anodes of each pair of cells are in electrical communication with one another. In various embodiments, fluid communication between each reservoir is provided via a tube connecting an outer surface of one oxygen substrate of a first pair with the outer surface of another oxygen substrate of another pair.

The system may further include a controller disposed in the vehicle and in electrical communication with the system. In various embodiments, the controller controls power directed to the anode and cathode of the system in response to a signal generated from a sensor mounted in the vehicle and may further control power directed to the pump when so provided. In various embodiments, the sensor may be mounted in the engine of the vehicle and configured to detect vacuum pressure as the engine runs.

In another aspect, the invention provides a method for supplying hydrogen gas to an internal combustion and/or diesel engine. The method includes supplying electrical power to the portable hydrogen supplemental system provided herein, where the output port of the collector is in fluid communication with an intake manifold of the vehicle. In various embodiments, the method also includes supplying water to the reservoir of the system, supplying electrical power to the cathode and anode of the cells of the system to produce hydrogen gas and oxygen gas, supplying the produced hydrogen gas to the intake manifold of the vehicle and venting the produced oxygen gas to atmosphere, and pumping the collected water back into the reservoir of the system.

DETAILED DESCRIPTION OF THE INVENTION

The present invention is based on a finding that an electrolyzer can be formed using a modular approach, where the electrolyzer includes one or more pairs of cells, depending on the hydrogen supplementation needs of the internal combustion and/or diesel engine to which it is connected, to produce hydrogen gas from water.

Before the present compositions and methods are described, it is to be understood that this invention is not limited to particular configurations, methods, and experimental conditions described, as such configurations, methods, and conditions may vary. It is also to be understood that the terminology used herein is for purposes of describing particular embodiments only, and is not intended to be limiting, since the scope of the present invention will be limited only in the appended claims.

Unless defined otherwise, all technical and scientific terms used herein have the same meaning as commonly understood by one of ordinary skill in the art to which this invention belongs. Although any methods and materials similar or equivalent to those described herein can be used in the practice or testing of the invention, the preferred methods and materials are now described.

As used in this specification and the appended claims, the singular forms "a", "an", and "the" include plural references unless the context clearly dictates otherwise. Thus, for example, references to "a cell" or "the cell" includes one or more cells of the type described herein which will become apparent to those persons skilled in the art upon reading this disclosure and so forth.

The term "comprising," which is used interchangeably with "including," "containing," or "characterized by," is inclusive or open-ended language and does not exclude additional, unrecited elements or method steps. The phrase "consisting of" excludes any element, step, or ingredient not specified in the claim. The phrase "consisting essentially of" limits the scope of a claim to the specified materials or steps and those that do not materially affect the basic and novel characteristics of the claimed invention. The present disclosure contemplates embodiments of the invention compositions and methods corresponding to the scope of each of these phrases. Thus, a composition or method comprising recited elements or steps contemplates particular embodiments in which the composition or method consists essentially of or consists of those elements or steps.

As used herein, "or" means "and/or" unless stated otherwise. Furthermore, use of the term "including" as well as other forms, such as "includes," and "included," is not limiting.

Figure 1:
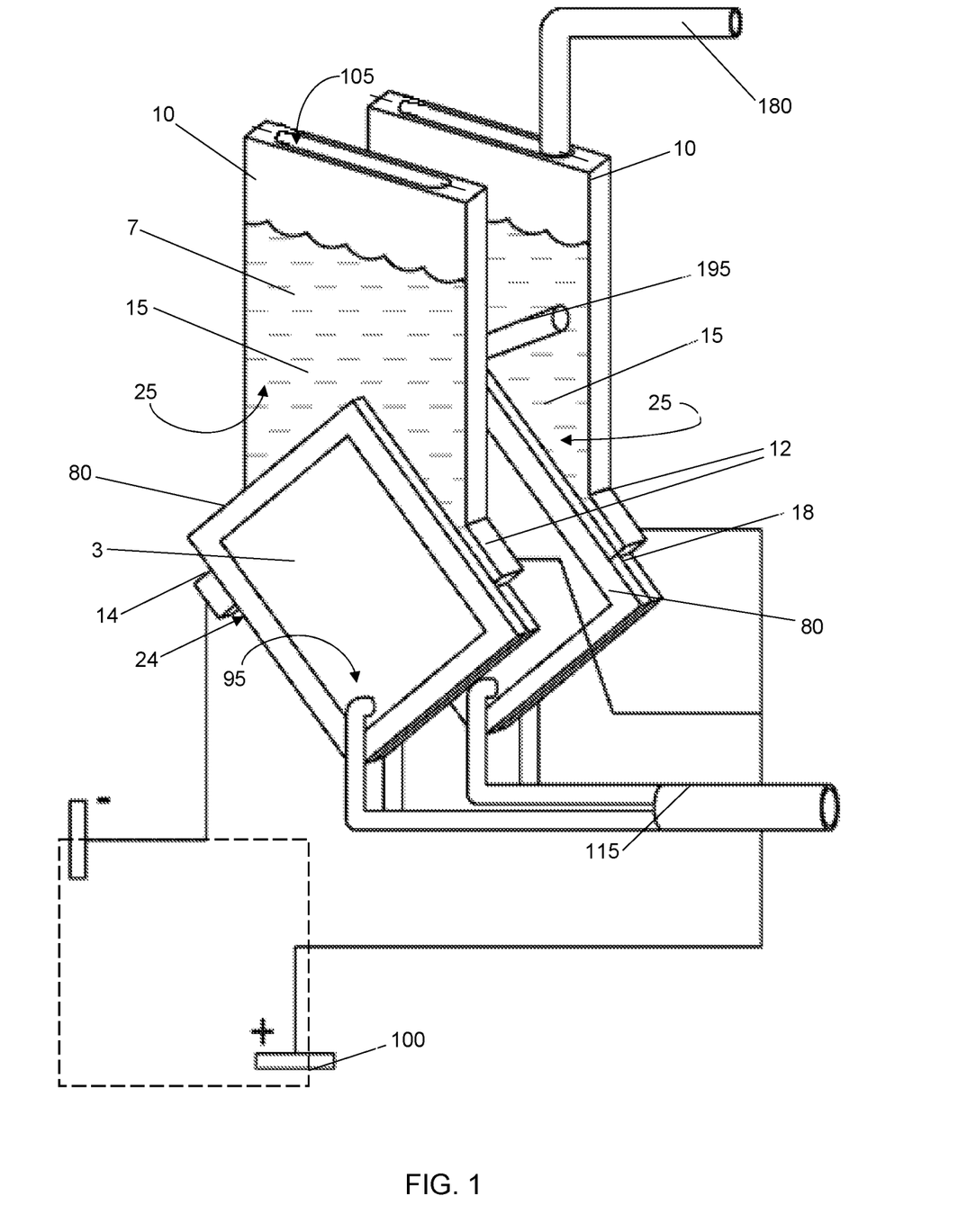
FIG. 1 is a pictorial diagram showing an exemplary embodiment of the system.
Figure 2:
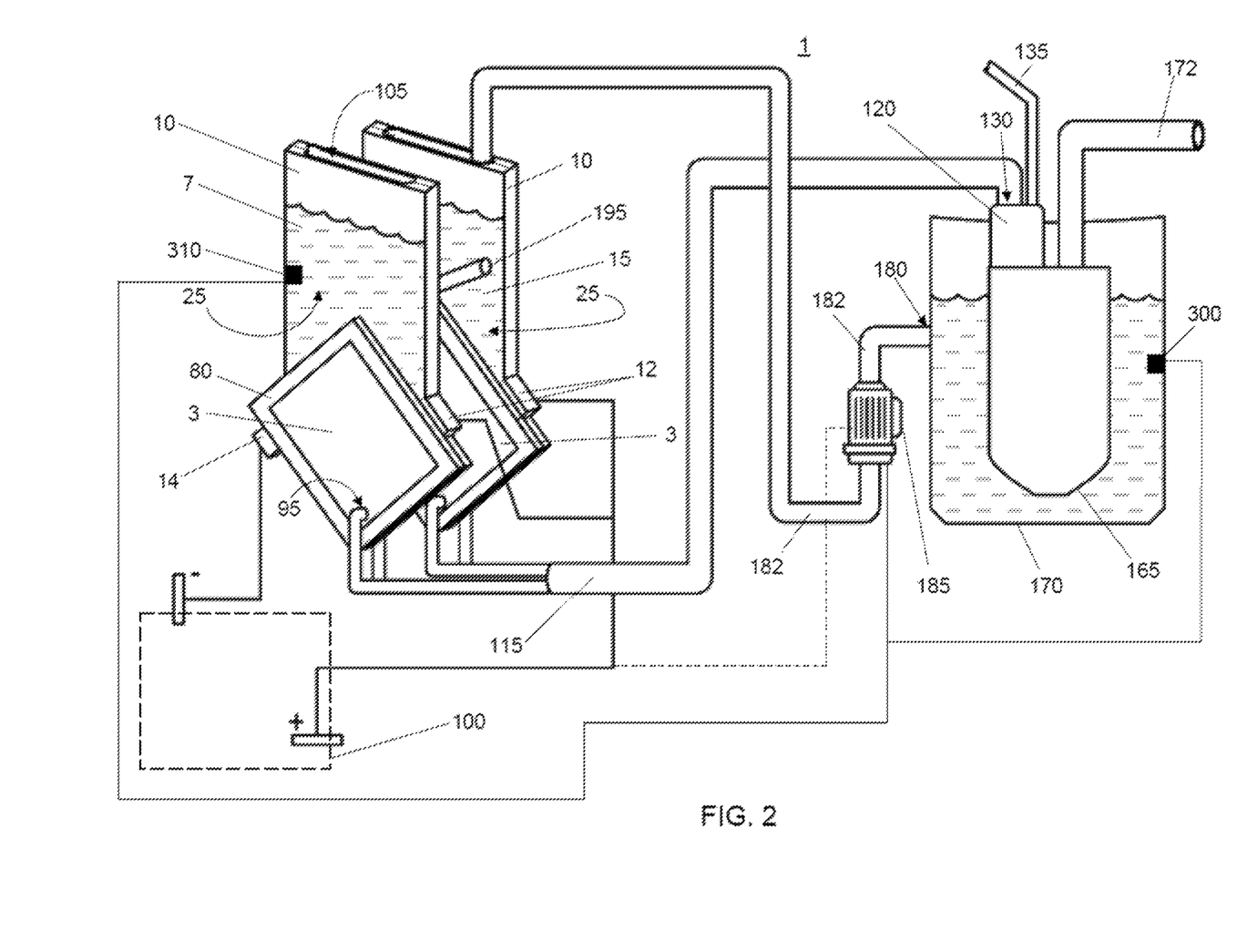
FIG. 2 is a pictorial diagram showing an exemplary embodiment of the system with additional components.
Figure 8:
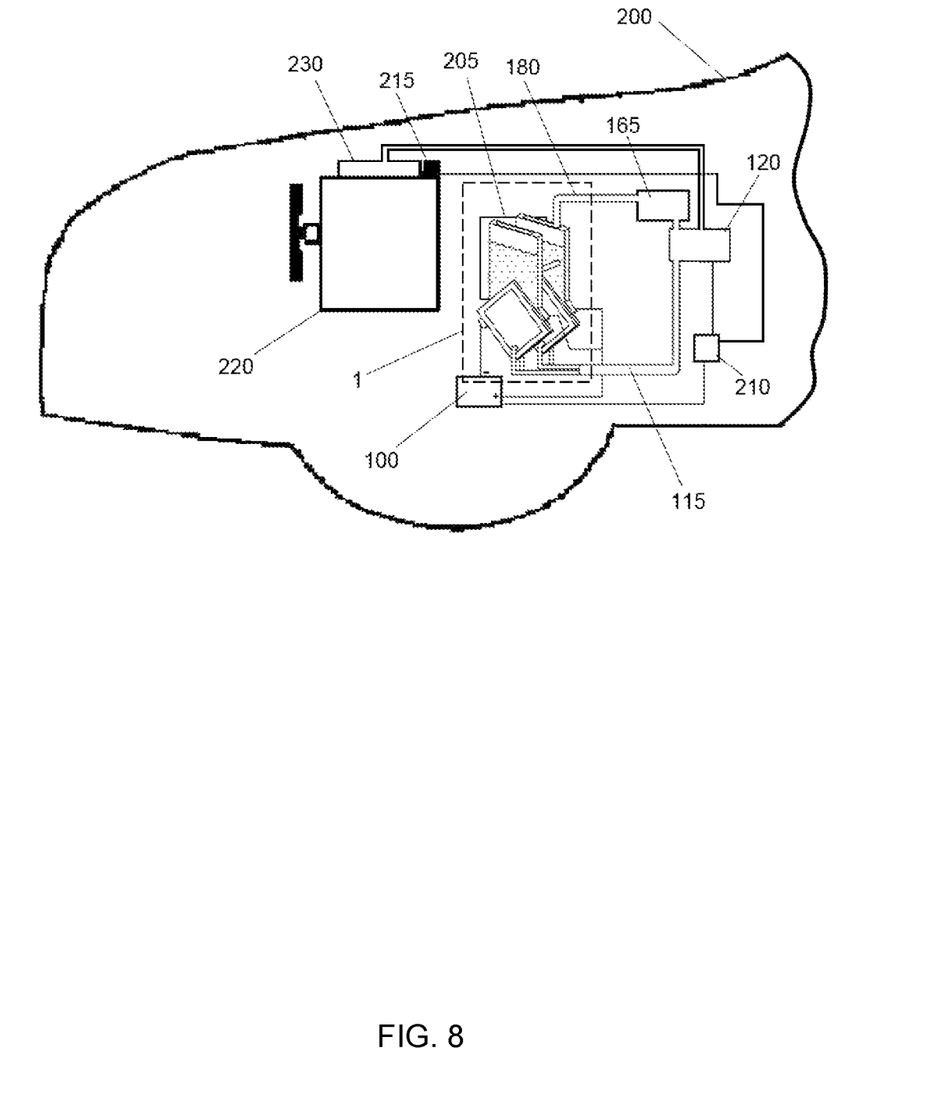
FIG. 8 is a pictorial diagram showing a partial cross-sectional view of a vehicle having an engine and the system mounted thereto.

Referring now to FIGS. 1, 2 and 8, the present invention provides a portable hydrogen supplementation system 1 for supplying hydrogen gas to an internal combustion or diesel engine, which may be securely mounted in a vehicle 200 or in close proximity to an internal combustion or diesel engine of a power generation device, such as a standalone diesel power generator. The hydrogen gas can be directed to the air intake of the engine 220 to improve the combustion of the fuel in the combustion chamber of the engine 220. In various embodiments, the hydrogen can be directed to the air intake (i.e., intake manifold) 230 at specific rates and under a specific gaseous pressure value, depending on the demands of the engine 220 of the vehicle 200. As such, the system 1 can utilize a vacuum switch 215 or other engine sensor to regulates the power supplied to the system 1 and, therefore, control hydrogen gas production only when the engine 220 is running and/or is running at a speed when pollutants are increased (i.e., at idle).

Figure 4A:
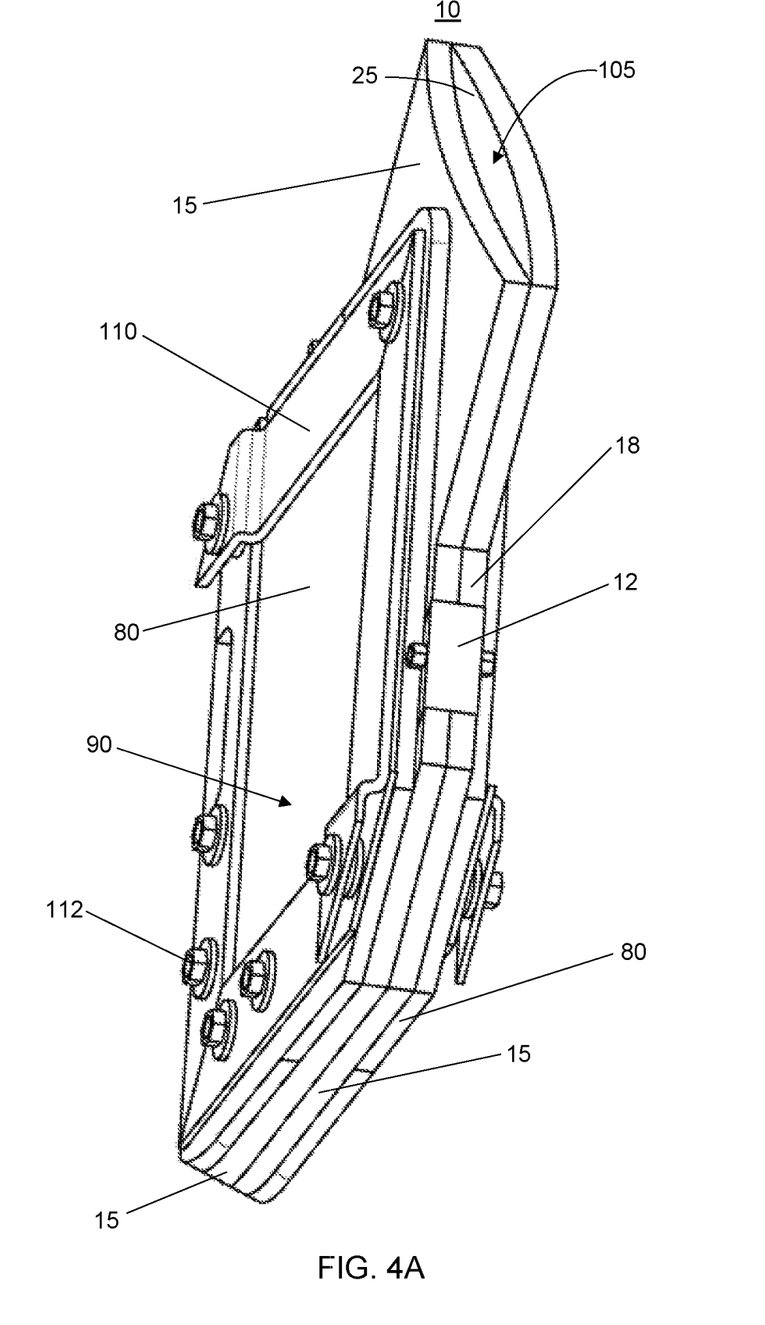
FIG. 4A is a pictorial diagram showing a perspective view of an exemplary pair of cells attached to one another and forming a reservoir.
Figure 4B:
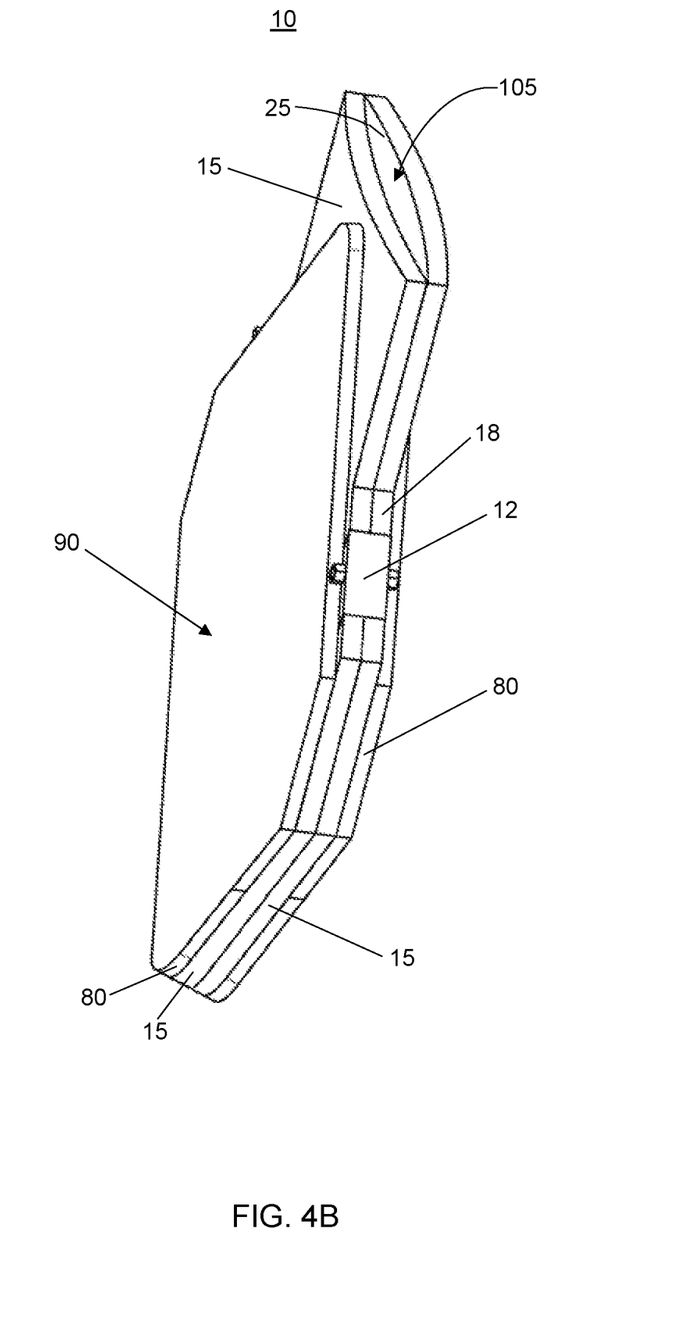
FIG. 4B is a pictorial diagram showing a perspective view of an exemplary pair of cells attached to one another and forming a reservoir.

The system 1 includes at least one pair of cells 10 that, together, form a reservoir 105 adjacent to and in fluid communication with a pair of electrolyzers 3 such that the reservoir 105 supplies water 7 to the pair of cells 10 by gravity (see, FIGS. 4A and 4B). In various embodiments, the system 1 may include more than one pair of cells 10, depending on the size of the engine to which the system is attached. For example, a small internal combustion engine may only require a system 1 having a single pair of cells 10, whereas a large diesel engine may require two pairs of cells 10 (as shown in FIGS. 1 and 2) or more to supply a sufficient amount of hydrogen gas thereto. In embodiments where more than one pair of cells 10 is utilized, each reservoir 105 of each pair of cells 10 may be interconnected so as to provide fluid communication therebetween. In various embodiments the system may further include a tube or pipe 195 disposed on the outer surface of a portion of each pair of cells 10 and configured to flow water between each reservoir 105 of each pair of cells 10. In various embodiments, the water supplied to the system 1 is nonelectrolyte water.

The system 1 further includes an anode 12 and cathode 14 at the electrolyzer 3 that are provided in electrical communication with a power supply 100. This power supply 110 can be the vehicle's electrical system (i.e., the vehicle's alternator and/or the vehicle's battery), a stand-alone battery, a solar cell, or any combination thereof. As such, when power is supplied in the form of voltage to the anode 12 and cathode 14 of the system 1, and water is provided in the reservoir 105, the electrolyzer 3 forms protons, electrons and gaseous oxygen under the influence of the generated electrical field. The gaseous oxygen leaves the electrolyzer 3 in the form of bubbles through the reservoir 105 while the protons move through the electrolyzer 3 under the influence of the applied electric field and electrons move through a circuit created therein. The protons and electrons combine at the negatively charged electrode (i.e., cathode 70), to form pure gaseous hydrogen, which exits via output port 95. The output ports 95 of each cell 5 of the pair of cells 10 may then be combined into a single hydrogen supply pipe 115, which may be configured to deliver the gaseous hydrogen to the engine of the vehicle.

With reference now to FIGS. 3A, 3B, 4A, and 4B, the pair of cells 10 is formed by sealingly attaching an oxygen substrate 15 of one cell 5 from the pair of cells 10 to the oxygen substrate 15 of the other cell 5. Thus, each pair of cells 10 may be understood to include a single reservoir 105 that feeds water into a pair of electrolyzers 3, where each electrolyzer is formed within each cell.

Figure 5:
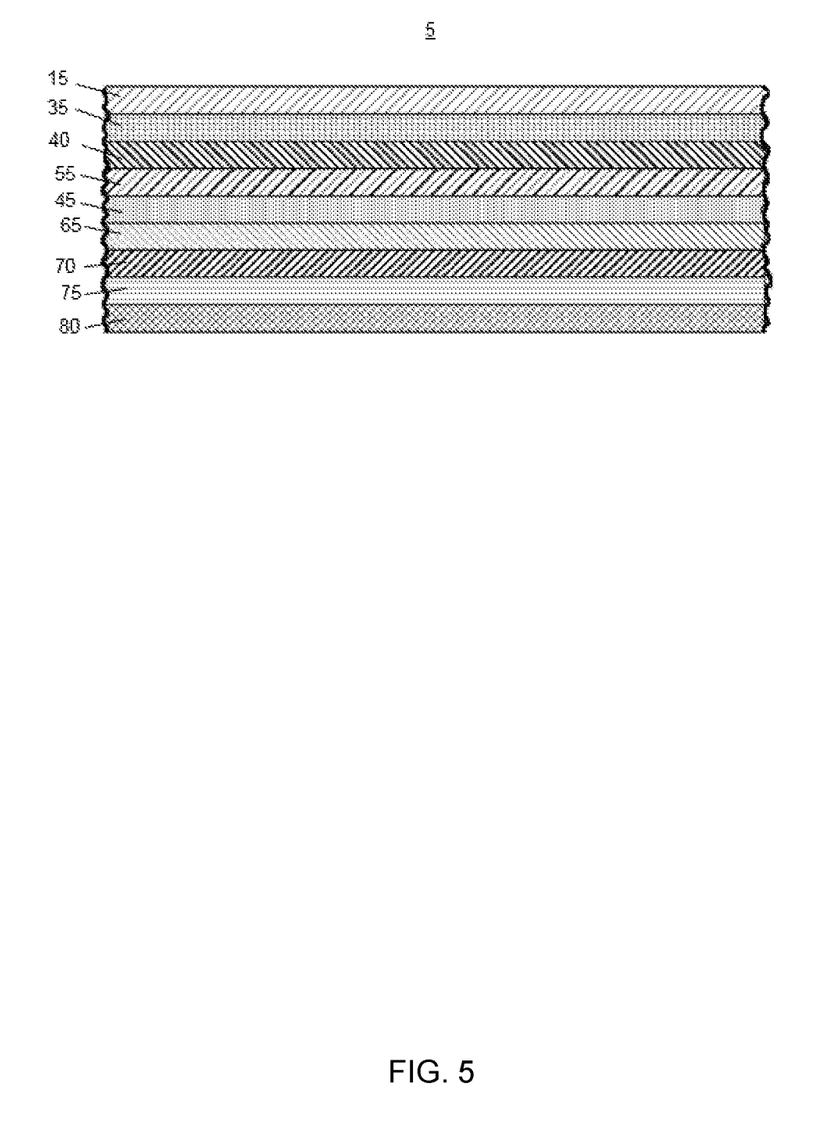
FIG. 5 is a pictorial diagram showing a cross-sectional view of an exemplary cell for use in the system.
Figure 6:
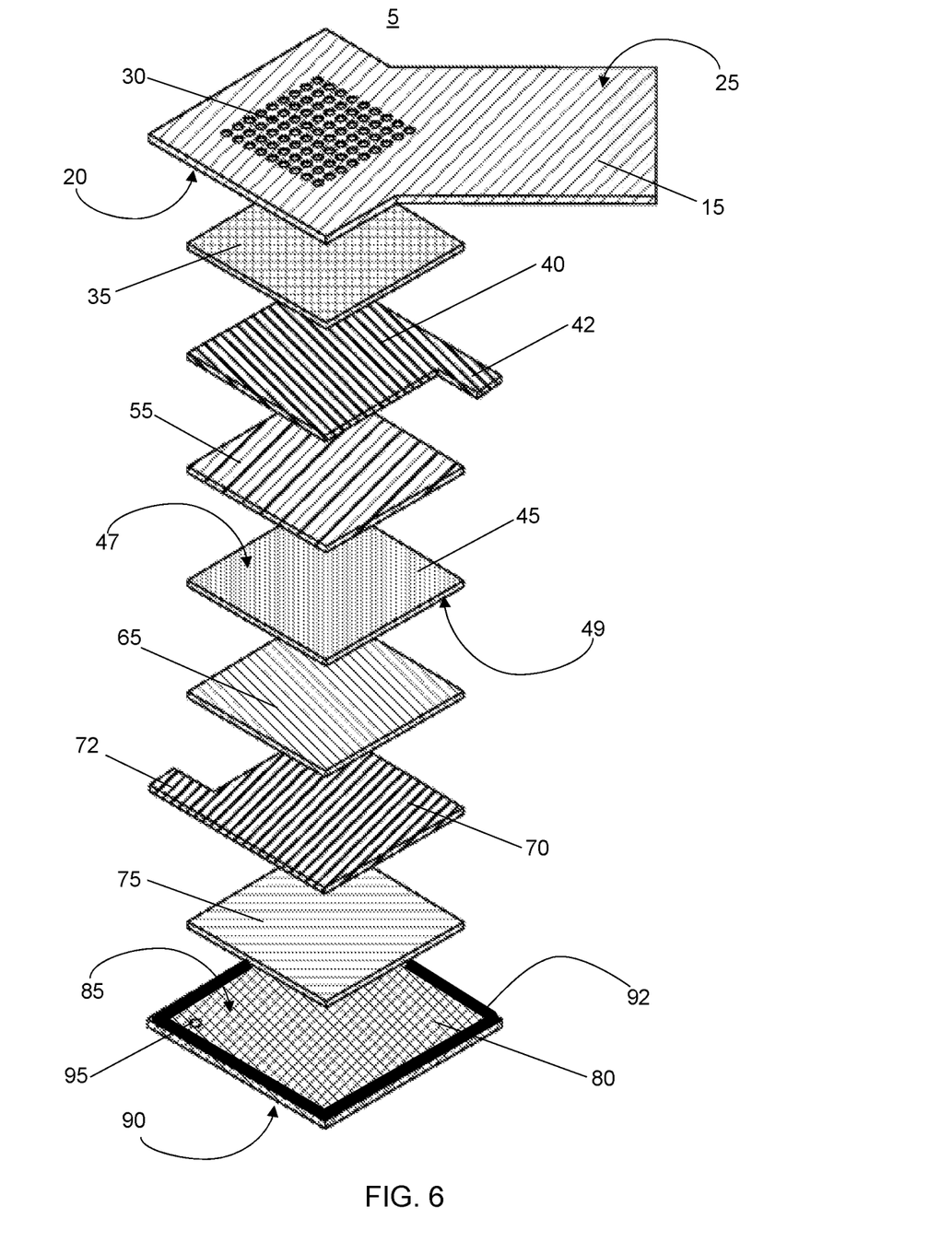
FIG. 6 is a pictorial diagram showing an exploded view showing the components of an exemplary cell of the system.

Referring now to FIGS. 5 and 6, each cell 5 includes an oxygen substrate 15 having an inner surface 20, an outer surface 25 and a plurality of through-holes 30 disposed therethrough. The through-holes 30 are configured to permit water to flow from the reservoir 105 into the electrolyzer 3 of each cell. The oxygen substrate 15 may be formed from any rigid non-conductive material, such as plastic, glass or a metal coated with a non-conductive layer, such as a plastic layer. In various embodiments, the oxygen substrate 15 is formed from polycarbonate.

A first diffusion layer 35 is disposed on the inner surface 20 of the oxygen substrate 15 and in fluid communication with the plurality of through-holes 30. The first diffusion layer 35 may be sized and shaped to cover the plurality of through-holes 30 and may extend toward outer edges of the oxygen substrate 15. In various embodiments, the first diffusion layer 35 may be formed from a non-conductive material, such as a woven or non-woven material provided that the first diffusion layer 35 is configured to capture and hold water droplets (e.g., via surface tension) while also providing tensional force between the oxygen substrate 15 and the next layer of the cell 5 to maximize surface contact area amongst the layers of the cell 5 (see FIG. 6). In various embodiments, the first diffusion layer 35 may be formed from woven polypropylene.

Disposed on the first diffusion layer 35 is an anode 40. The anode 40 may be sized and shaped to substantially cover the first diffusion layer 35 and may include an anode extension 42 that extends beyond the outer surface 25 of the oxygen substrate 15. In various embodiments, the anode 40 may be formed from a conductive material, such as a metal wire mesh. In various embodiments the anode 40 is formed from a stainless-steel wire mesh. Thus, when the cell 5 is completely assembled, the first diffusion layer 35 is configured to apply tensional force to the oxygen substrate 15 and the anode 40 to maximize surface contact area between the anode 40 and the next layer of the cell 5.

Disposed on the anode 40 is a membrane 45 having a first surface 47 and a second surface 49, where the first surface 47 is provided in contact with the anode. The membrane 45 is typically a selectively permeable membrane, such as an ion exchange membrane. In various embodiments, the membrane 45 may be a fluoropolymer membrane which contains sulfonic acid groups ($SO_3H$). Such membranes are commercially available under the tradename of NAFION® by E. I. du Pont de Nemours and Company, Wilmington, Del. Such membranes allow for the rapid transfer of ions while being substantially impermeable to gases such as oxygen and hydrogen. Without being bound by theory, the sulfonic groups easily release their hydrogen as positively-charged atoms or protons by the following equation: $SO_3H \rightarrow SO_3^- + H^+$. These ionic or charged forms allow water to penetrate into the membrane structure but not the product gases, namely molecular hydrogen $H_2$ and oxygen $O_2$. The resulting hydrated proton, $H_3O^+$, is free to move whereas the sulphonate ion $SO_3^-$ remains fixed to the polymer sidechain of the membrane 45. Thus, when an electric field is applied across the membrane 45, the hydrated protons are attracted to the negatively charged electrode (i.e., cathode 70, described below). Since a moving charge is identical with electric current, the membrane 45 acts as a conductor of electricity. As such, the membrane 45 serves to separate reactants and transport protons within the cell 5.

In various embodiments, the first surface 47 of the membrane 45 may be treated or coated with a first catalyst 55, such that the first catalyst is disposed between the anode 40 and the first surface 47 of the membrane 45. The first catalyst 55 may be applied to the first surface 47 of the membrane 45 by any methods known in the art for surface modification. For example, a slurry may be formed from the first catalyst 55, and the resulting slurry may be painted, sprayed, or grafted on to the first surface 47 of the membrane. Likewise, the second surface 49 of the membrane 45 may be treated with a second catalyst 65 such that the second catalyst 65 is disposed between the membrane 45 and the next layer of the cell 5. As with the first catalyst 55, the second catalyst 65 may be applied to the second surface 49 of the membrane 45 by any methods known in the art for surface modification. It should be understood that while the Figures show incorporation of both the first catalyst 55 and the second catalyst 65, the cell 5 may be formed using only the first catalyst 55 or only the second catalyst 65. Exemplary materials that may be used for the first catalyst 55 and second catalyst 65 include, but are not limited to, platinum black and iridium ruthenium oxide. While the Figures exemplify use of different materials for each of the first catalyst 55 and the second catalyst 65, it should be understood that the first catalyst 55 and the second catalyst 65 may be formed from the same material.

Disposed on the second surface of the membrane 45 is a cathode 70. However, in embodiments that incorporate a second catalyst 65 disposed on the second surface 49 of the membrane 45, it may be understood that the second catalyst 65 is provided between the second surface 49 of the membrane 45 and the cathode 70. As with the anode 40, the cathode 70 may be sized and shaped to substantially cover the membrane 45 and may include a cathode extension 72 that extends beyond the outer surface 25 of the oxygen substrate 15. In various embodiments, the cathode 70 may be formed from a conductive material, such as a metal wire mesh. In various embodiments the cathode 70 is formed from a stainless-steel wire mesh.

A second diffusion layer 75 is disposed on the cathode 70. As with the first diffusion layer 35, the second diffusion layer 75 may be sized and shaped to cover or substantially cover the cathode 70 and may extend toward outer edges of the oxygen substrate 15. In various embodiments, the second diffusion layer 75 may be formed from a non-conductive material, such as a woven or non-woven material, and optionally, may likewise be configured to capture and hold water droplets (e.g., via surface tension) while also providing tensional force between the cathode 70 and the next layer of the cell 5 to further increase surface contact area amongst the layers of the cell 5 (see FIG. 6). In various embodiments, the second diffusion layer 75 may be formed from woven polypropylene.

Disposed on the second diffusion layer 75 is a hydrogen substrate 80 having an inner surface 85, an outer surface 90, and an output port 95, where the output port 95 is a through-hole disposed therethrough. The output port 95 is configured to flow gaseous hydrogen out of the cell 5 created by the voltage applied to the anode 40 and cathode 70. Accordingly, the inner surface 85 of the hydrogen substrate 80 is disposed in contact with the second diffusion layer 75. Thus, the second diffusion layer 75 may be configured to provide additional tensional force between the cathode 70 and the hydrogen substrate 80 of the cell 5 to further increase surface contact area amongst the layers of the cell 5 (see FIG. 6). As with the oxygen substrate 15, the hydrogen substrate 80 may be formed from any rigid non-conductive material, such as plastic, glass or a metal coated with a non-conductive layer, such as a plastic layer. In various embodiments, the hydrogen substrate 80 is formed from polycarbonate.

Figure 3A:
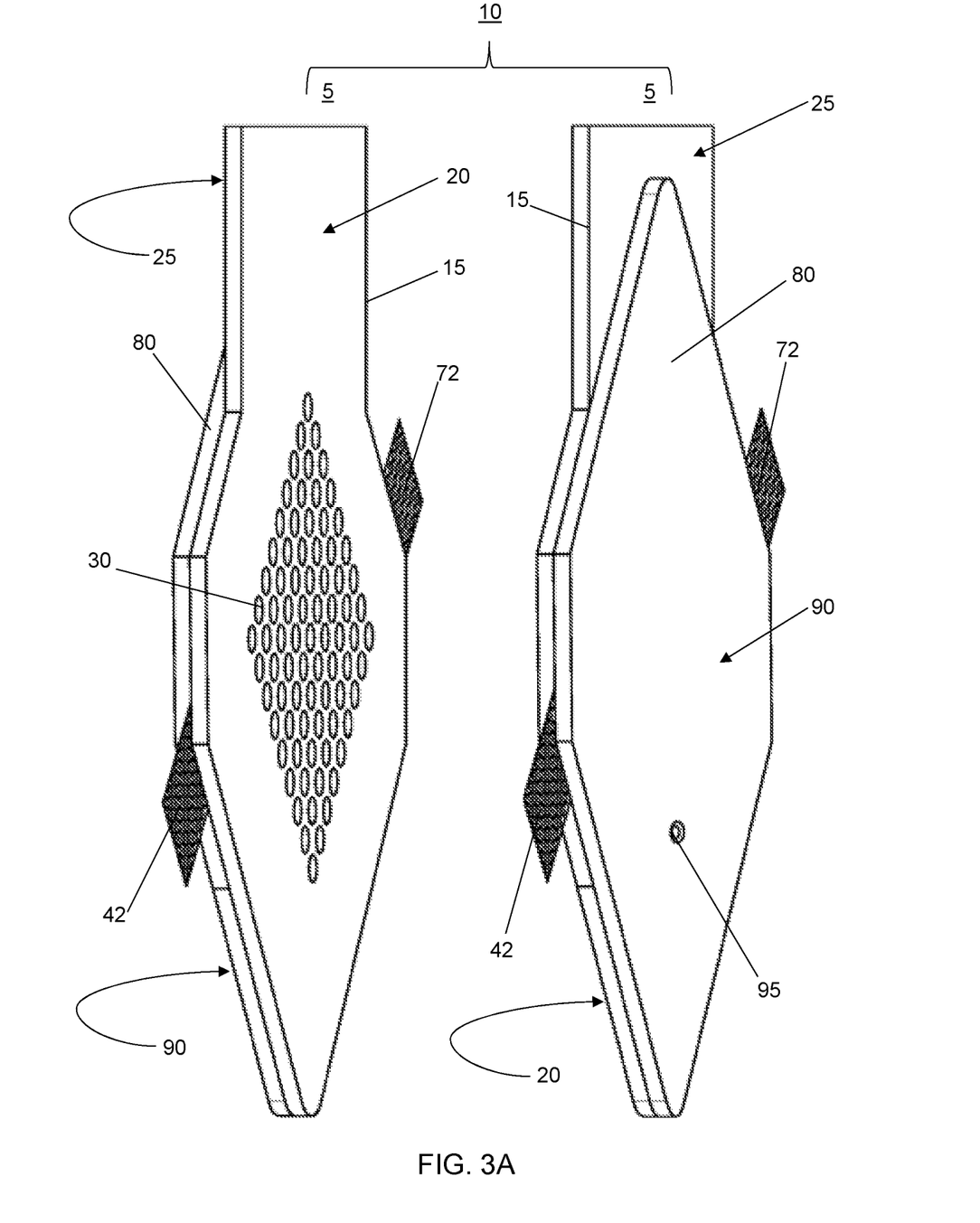
FIG. 3A is a pictorial diagram showing a perspective view of an exemplary pair of cells used in the system.
Figure 3B:
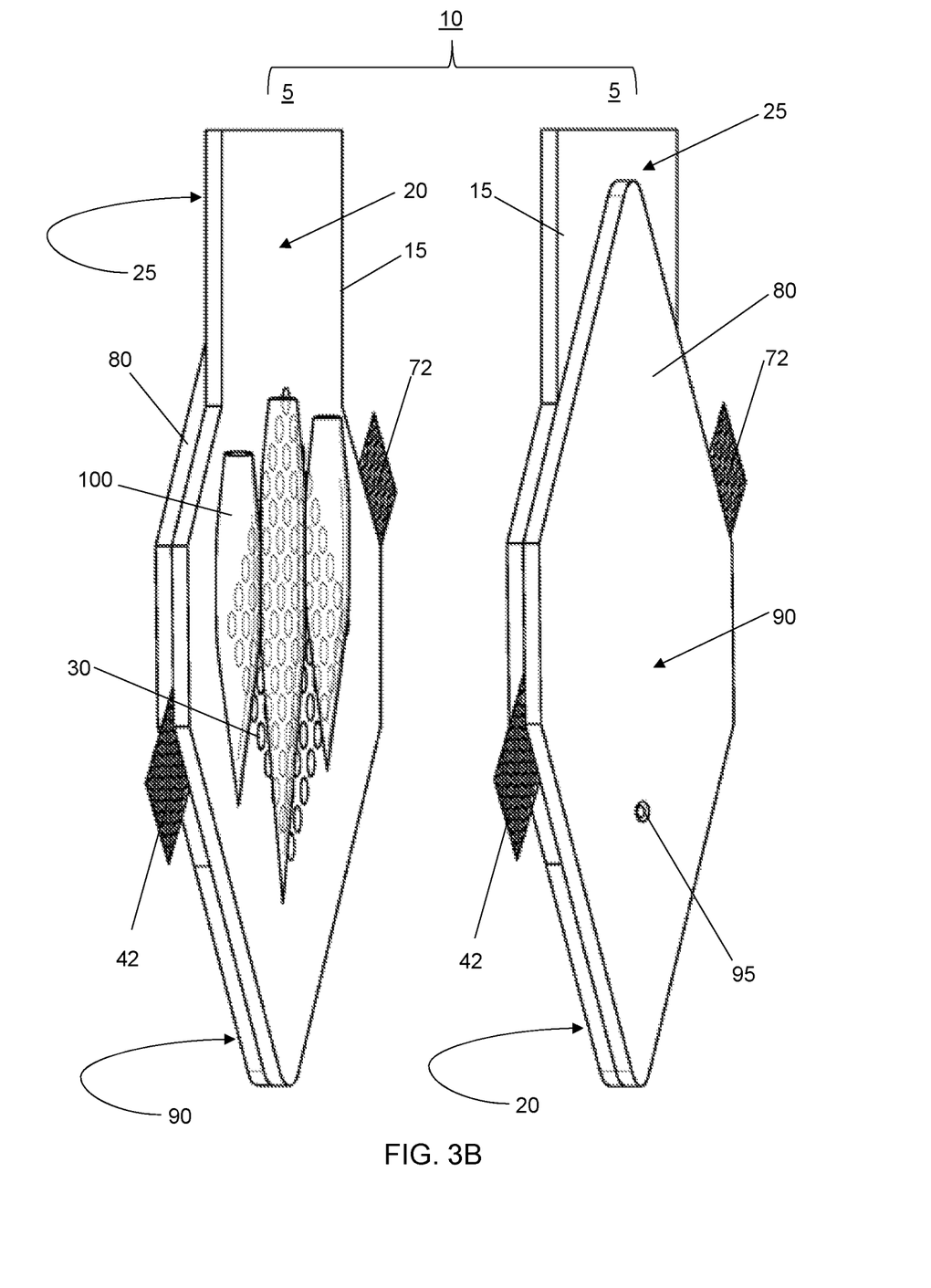
FIG. 3B is a pictorial diagram showing a perspective view of an exemplary pair of cells with spacers.

As shown in FIGS. 3A and 3B, the inner surface 20 of the oxygen substrate 15 and the inner surface 85 of the hydrogen substrate 80 may be sealingly attached to one another with the above-discussed layers being sandwiched therebetween (see FIG. 6). Any known method for attaching the materials from which the oxygen substrate 15 and the hydrogen substrate 80 to one another may be used herein, provided that the resulting attachment is water-tight to prevent unintended leakage out of the cell 5. For example, the oxygen substrate 15 and the hydrogen substrate 80 may be bonded to one another using an epoxide glue (i.e., epoxy) or other known adhesives, by fusing the materials to one another (for example, using directed heat or lasers), or by using a bonding film or adhesive tape disposed around a periphery of each substrate to form a water-tight seal. In various embodiments, a bonding film or adhesive tape 92 (such as 3M VHB 4905 and/or VHB 4910) is applied to the periphery of the inner surface 85 of the hydrogen substrate 80. It should be understood that multiple layers of the bonding film or adhesive tape 92 may be used to account for the thickness created by the above-discussed layers of the cell 5. The resulting individual cells 5, may thereafter, be mated to one another with the plurality of through-holes 30 of the oxygen substrate 15 of one cell 5 facing the plurality of through-holes 30 of the oxygen substrate 15 of another cell 5, thereby forming a pair of cells 10.

As shown in FIG. 3B, the pair of cells 10 may further include one or more spacers 100 disposed on the outer surface 25 of one or both oxygen substrates 15 of the pair of cells 10. It should be understood that while FIG. 3B shows three spacers 100 disposed on the outer surface 25 of one cell 5, any reasonable number of spacers 100 may be utilized. The spacer 100 may be formed from any rigid non-conductive material, such as glass, plastic or a metal coated with a plastic layer. In various embodiments, the spacer 100 is formed from the same material as that of the oxygen substrate 15, and may further be integrated into the outer surface 25 of the oxygen substrate 15 such that the spacer 100 and the oxygen substrate 15 are formed as a single unit. It should be understood that the number of spacers 100 formed on one cell 5 may be different from the number of spacers 100 formed on the outer surface 25 of the oxygen substrate 15 of another cell 5 of the pair of cells 10. For example, the outer surface 25 of the oxygen substrate 15 of one cell 5 may be formed with two spacers 100 and the outer surface 25 of the oxygen substrate 15 of another cell 5 may be formed with one spacer. Similarly, the outer surface 25 of the oxygen substrate 15 of one cell may be formed with a single spacer 100, while the outer surface 25 of the oxygen substrate 15 of another cell may be formed without a spacer 100.

Accordingly, as shown in FIGS. 4A and 4B, when the outer surface 25 of the oxygen substrate 15 of one cell 5 is mated to the outer surface 25 of the oxygen substrate 15 of another cell 5, the spacer 100 displaces (i.e., bows) at least a portion of the both oxygen substrates 15 to form a reservoir 105 therebetween and also serves to enhance the surface contact area of the anode 40 and cathode 70 to the membrane 45. As such, the number of spacers 100 required to create the reservoir and enhance surface contact may range from one to three or more. The oxygen substrates 15 of each cell may be sealingly attached to one another using any known method for attaching the materials from which the oxygen substrates 15 are formed, provided that the resulting attachment is water-tight to prevent unintended leakage out of the pair of cells 10. In embodiments where the spacer 100 is not formed integral to the outer surface 15 of the oxygen substrate 15, the spacer 100 may be inserted between the respective oxygen substrates 15 of each cell 5 prior to, during, or after the sealing attachment of one cell 5 to the other. In various embodiments, the pair of cells 10 may further include a frame 110 disposed around a periphery of the outer surface 90 of the hydrogen substrates 80 of each cell 5. When so utilized, the frame 110 may be configured to apply additional compressive force toward each oxygen substrate 15 to ensure water-tight attachment of one cell 5 to the other. In various embodiments, the frame 110 may be formed as a pair of single units that are each disposed around the periphery of the outer surface 90 of the hydrogen substrates 80 or each frame 110 may be formed from multiple units (as shown) disposed around the periphery of the outer surface 90 of the hydrogen substrates 80. The frame may further include a plurality of fasteners 112 configured to sealingly traverse through the hydrogen substrate 80 and oxygen substrate 15 of each cell 5.

Once a pair of cells 10 with corresponding reservoir 105 is formed, the anode extension 42 of each cell 5 may be electrically bonded to one another, thereby forming a single anode/electrode 12 for the pair of cells 10. For example, the anode extension 42 of a first cell 5 may be folded in the direction of the hydrogen substrate 80 of the second cell 5 of the pair, while the anode extension 42 of the second cell 5 is folded toward the hydrogen substrate 80 of the first cell 5, and both anode extensions 42 may be bonded to one another. The resulting single anode 12 of the pair of cells 10 will therefore be located on a side surface 18 of the pair of cells 10. Likewise, the cathode extension 72 of each cell 5 may be electrically bonded to one another, thereby forming a single cathode/electrode 14 for the pair of cells 10. As with the anode extensions 42, the cathode extension 72 of a first cell 5 may be folded in the direction of the hydrogen substrate 80 of the second cell 5 of the pair, while the cathode extension 72 of the second cell 5 is folded toward the hydrogen substrate 80 of the first cell 5, and both cathode extensions 72 may be bonded to one another. The resulting single cathode 14 of the pair of cells 10 will therefore be located on a side surface 24 of the pair of cells 10. In various embodiments, each of the side surfaces (18 and 24) of the pair of cells 10 are opposite one another. Any method for electrically bonding two metallic materials may be used to bond the anode and cathode extensions (42, 72), respectively. For example, the respective extensions (42, 72) may be bonded using welding, soldering, or by means of conductive adhesives, provided that there is electrical communication between each pair of the respective extensions (42, 72).

Figure 7:
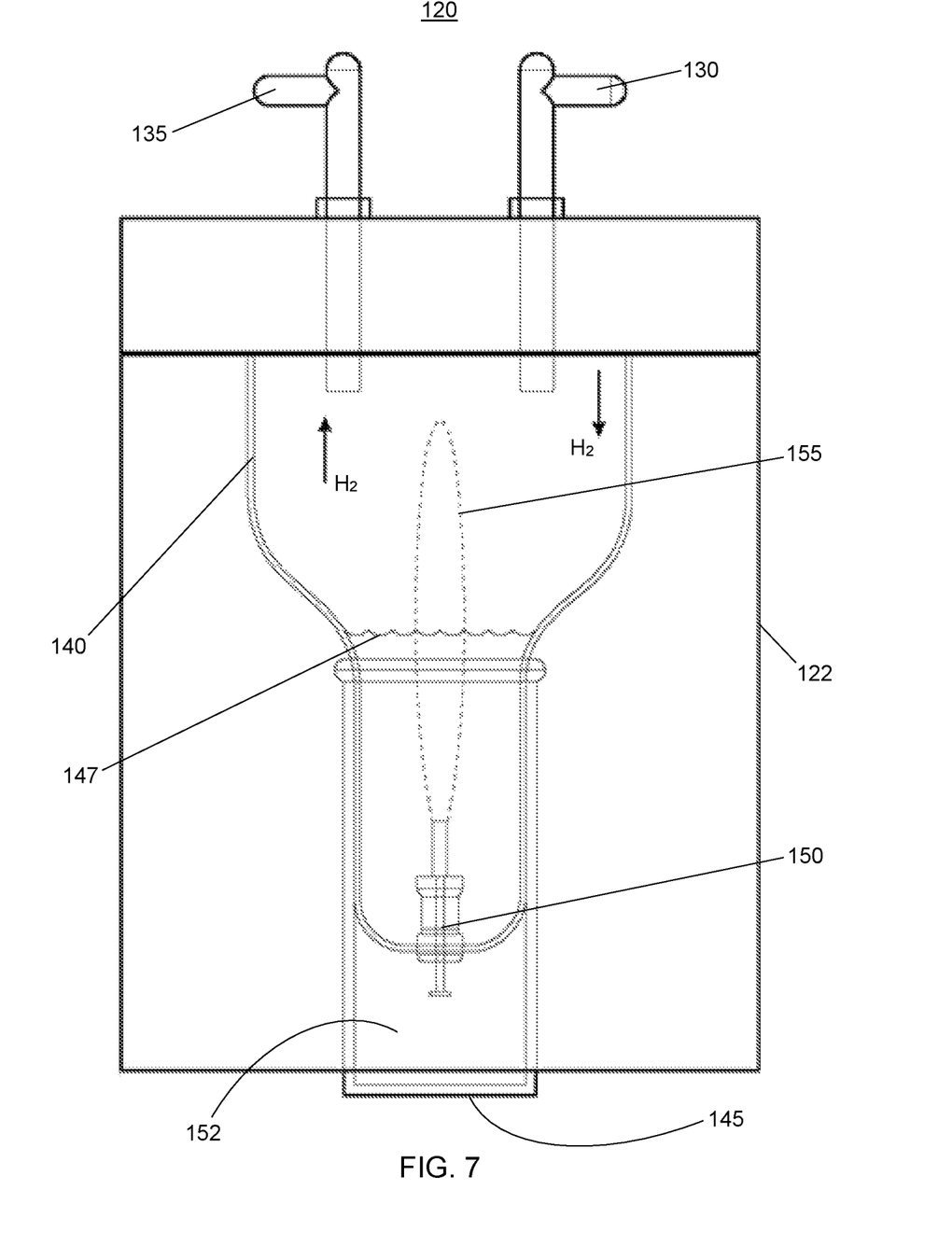
FIG. 7 is a pictorial diagram showing a cross-sectional view of an exemplary collector of the system.

During operation of the system 1, a small amount of water 7 may be contained in hydrogen gas and oxygen gas as they emerge from the output port 95 and reservoir 105, respectively, of the pair of cells 10. As can be expected, the moisture contained in the oxygen gas is captured by the residual water 7 contained in the reservoir 105, as the oxygen vents to atmosphere. To address water contained in the hydrogen gas, the system 1 may further include a collector 120 disposed in fluid communication with the hydrogen supply pipe 115 of the system 1, and configured to separate water from collected hydrogen gas before the hydrogen gas is supplied to the intake manifold 230 of the engine 220, as shown in FIG. 2. In various embodiments, the collector 120 may be further configured to store hydrogen gas within its housing 122 prior to flowing the hydrogen gas to the engine of the vehicle. As shown in FIG. 7, the collector 120 includes a housing 122, an input port 130, an output port 135 and a liquid port 145. The input port 130 is provided in fluid communication with the output port 95 of each of cell 5, for example, via the hydrogen supply pipe 115. The output port 135 is provided in fluid communication with the intake manifold of the engine and is configured to flow dry or substantially dry hydrogen gas to the intake manifold of the engine. The liquid port 145 is disposed within the housing 122 and is configured to flow separated water 147 out of the collector 120. In various embodiments, the liquid port 145 is provided in fluid communication with the reservoir 105 of the system to recycle separated water back into the system to generate additional hydrogen gas. The collector 120 may further include a boot 140 disposed within a housing 122, where the boot 140 is provided in fluid communication with the input port 130 and the output port 135 thereof. As such, separated water 147 flows to the bottom of the boot 140 by gravity and is collected therein until a predetermined amount of separated water 147 is collected. Disposed within the boot 140 may be a valve 150 configured to flow water into a chamber 152 that is separated from the boot and configured to flow separated water 147 through the liquid port 145. Fixedly attached to the valve 150 may be a float 155, the float being configured to open the valve when the level of separated water 147 reaches a predetermined height relative to the bottom of the boot 140. When the valve 150 opens, the separated water 147 may flow through the liquid port 145.

Turning back to FIG. 2, the system 1 may further include a filter 165 provided in fluid communication with the liquid port 145 of the collector 120. The filter 165 may be incorporated into the system 1 to filter any impurities in the separated water 147 prior to recycling the water back into the reservoir 105 of the system 1. Thus, as show, the collector 120 and filter 165 may be provided in a tank 170 that is fixedly mounted in the vehicle. The tank 170 may have an input port 172 and an output port 180, where the tank 170 configured to receive and store water to be supplied to the reservoir 105 of the system 1. As such, in embodiments where the collector 120 and filter 165 are provided within the tank 170, the filter 165 may supply the separated water received from the collector 120 directly to the supply of water to be provided to the reservoir 105. The system may also include a pump 185 disposed between the output port 180 of the tank 170 and the reservoir 105 of the system 1. In various embodiments, the pump 185 is disposed in fluid communication between the tank 170 and the reservoir 105 via tubing 182. The pump may be provided in electrical communication with the power supply 100 of the system 1, and may be configured to pump water from the tank to the reservoir 105 when: (i) the tank receives a predetermined amount of water; (ii) when the amount of water in the reservoir reaches a predetermined level (and therefore, the system requires additional water); or (iii) the demand for hydrogen by the engine of vehicle is such that the water within the reservoir 105 is continuously diminishing as a result of use of the system. Accordingly, the system 1 may further include a sensor 300 disposed in the tank and in electrical communication with the pump, the sensor 300 being configured to supply power to the pump 185 when the tank 170 receives a predetermined amount of water. Likewise, the system 1 may further include a sensor 310 disposed in the reservoir 105 and in electrical communication with the pump 185, the sensor 310 being configured to supply power to the pump 185 when water in the reservoir 105 reaches a predetermined level. As may be understood, the system 1 may include one or more of the above-discussed sensors, which may be configured to supply power to the pump 185 in tandem or independently.

As shown in FIG. 8, the system 1 may be fixedly mounted in close proximity to an engine 220 of a vehicle 200. The system 1 may include a rack or bracket 205 that is configured to securely hold the system in-place while being free from potential damage by moving parts of the engine 220 or vehicle 200. Thus, the pair of cells 10 of the system 1 may be mounted so as to allow easy servicing of the various components of the system 1. For example, the pair of cells 10 can be mounted to provide easy access to the reservoirs 105 of the pair of cells 10 to facilitate addition of water in configurations where a separate tank 170 is not utilized. In various embodiments, the system may further include a controller 210 incorporated into, or disposed within the vehicle 200, where the controller 210 is in electrical communication with the power supply 100. When a controller 210 is incorporated into the system 1, the pump 185 (if utilized) and all sensors (300, 310, vacuum switch 215 and/or other engine sensors) will all be in electrical communication with the controller 210, such that the controller 210 is configured to supply power to the anode 12 and cathode 14 of the system 1 and/or to the pump 185 in response to signals received from the one or more sensors.

The portable hydrogen supplemental system 1 operates optimally in a gasoline or diesel powered engine when the load on the engine 220 does not exceed a predetermined level and the amount of hydrogen produced by the system 1 and supplied to the engine 220 falls within a preset range. In operation, and depending upon the operation characteristics of the engine, as the load on the engine 220 increases, the demand for hydrogen can either increase or decrease. Power is thereafter supplied to the system 1 to produce an electrical field within the eletrolyzer 3 of each cell 5, thereby producing hydrogen gas and oxygen gas from the supplied water. As discussed above, the produced hydrogen gas is directed to the intake manifold 230 of the engine 220, while the produced oxygen is vented to atmosphere.

Although the invention has been described with reference to the above disclosure, it will be understood that modifications and variations are encompassed within the spirit and scope of the invention. Accordingly, the invention is limited only by the following claims.

What is claimed is:

1. A portable hydrogen supplementation system for supplying hydrogen gas, comprising a pair of cells, each cell comprising:
   (a) an oxygen substrate comprising an inner surface, an outer surface, and a plurality of through-holes;
   (b) a first diffusion layer disposed on the inner surface of the oxygen substrate and in fluid communication with the plurality of through-holes;
   (c) an anode disposed on the first diffusion layer;
   (d) a membrane comprising a first surface coated with a first catalyst and a second surface, wherein the first surface of the membrane is disposed on the anode;
   (e) a cathode disposed on the second surface of the membrane;
   (f) a second diffusion layer disposed on the cathode;
   (g) a hydrogen substrate comprising an inner surface, an outer surface, and an output port configured to flow gas therethrough, the inner surface being disposed on the second diffusion layer; and
   (h) a spacer disposed on the outer surface of the oxygen substrate,
wherein the outer surfaces of the oxygen substrates are sealingly attached to one another, thereby forming a reservoir with the spacer, the reservoir being configured to hold water, supply the water into each cell and vent oxygen out of each cell, wherein the anodes of each cell are electrically bonded to one another, and wherein the cathodes of each cell are electrically bonded to one another.

2. The system of claim 1, further comprising a power supply in electrical communication with the anode and cathode, wherein each cell, when supplied with power from the power supply, produces hydrogen gas and oxygen gas from the water, and wherein the hydrogen gas exits the output port.

3. The system of claim 1, wherein the membrane is a selectively permeable membrane.

4. The system of claim 3, wherein the membrane is an ion exchange membrane.

5. The system of claim 1, wherein the second surface of the membrane is coated with a second catalyst.

6. The system of claim 5, wherein the first and second catalysts are independently selected from the group consisting of platinum black and iridium ruthenium oxide.

7. The system of claim 1, wherein the first and second diffusion layers are formed from a non-conductive material.

8. The system of claim 7, wherein the first and second diffusion layers are formed from a woven polypropylene mesh.

9. The system of claim 8, wherein the first diffusion layer is configured to apply tensional force to the oxygen substrate and the anode, and the second diffusion layer is configured to apply tensional force to the hydrogen substrate and the cathode.

10. The system of claim 1, wherein the anode and cathode are each formed from a woven conductive mesh.

11. The system of claim 10, wherein the woven mesh is formed from stainless steel.

12. The system of claim 1, wherein the spacer is formed on the outer surface of the oxygen substrate.

13. The system of claim 1, wherein the output port of each cell is configured to flow hydrogen gas to an intake manifold of an internal combustion or diesel engine.

14. The system of claim 1, wherein each cell further comprises a frame disposed on the outer surface of each hydrogen substrate, each frame being configured to sealingly attach the pair of cells to one another.

15. The system of claim 1, further comprising a collector configured to separate water from collected hydrogen gas, the collector comprising:
    (a) an input port in fluid communication with the output port of each cell;
    (b) an output port configured to flow hydrogen gas to an intake manifold of an internal combustion or diesel engine; and
    (c) a liquid port configured to flow separated water therefrom.

16. The system of claim 15, wherein the collector further comprises:
    (d) a boot disposed within a housing, the boot being in fluid communication with the input port and the output port;
    (e) a chamber separated from the boot and configured to flow water through the liquid port;
    (f) a valve disposed within the boot, the valve being configured to flow water into the chamber; and
    (g) a float disposed within the boot and fixedly attached to the valve, wherein the float is configured to open the valve to flow separated water therethrough.

17. The system of claim 15, further comprising a filter in fluid communication with the liquid port and configured to filter impurities from the separated water.

18. The system of claim 17, wherein one or both of the collector and filter are disposed in a tank, the tank comprising an input port and an output port and being configured to supply fluid to the reservoir.

19. The system of claim 18, further comprising a pump disposed between the output port of the tank and the reservoir, the pump being configured to pump fluid from the tank to the reservoir.

20. The system of claim 19, further comprising a sensor disposed in the tank and in electrical communication with the pump, the sensor being configured to supply power to the pump when the tank receives a predetermined amount of water.

21. The system of claim 19, further comprising a sensor disposed in the reservoir and in electrical communication with the pump, the sensor being configured to supply power to the pump when water in the reservoir reaches a predetermined level.

22. The system of claim 1, further comprising one or more additional pairs of cells, wherein the reservoir of each pair are in fluid communication with one another, the output ports of each hydrogen substrate are in fluid communication with one another, the cathodes of each pair of cells are in electrical communication with one another, and the anodes of each pair of cells are in electrical communication with one another.

23. The system of claim 22, wherein fluid communication between each reservoir is provided via a tube connecting an outer surface of one oxygen substrate of a first pair with the outer surface of another oxygen substrate of another pair.

24. The system of claim 1, wherein the pair of cells is mounted in a rack configured for mounting the system in a vehicle having an internal combustion engine or a diesel engine.

25. The system of claim 24, further comprising a controller disposed in the vehicle and in electrical communication with the system, wherein the controller controls power directed to the anode and cathode of the system in response to a signal generated from a sensor mounted in the vehicle.

26. The system of claim 25, wherein the sensor is mounted in the engine of the vehicle, the controller sensor being configured to detect vacuum pressure as the engine runs.

27. A method for supplying hydrogen gas to an engine comprising:
    (a) providing the system of claim 19 in a vehicle, wherein the output port of the collector is in fluid communication with an intake manifold of the vehicle;
    (b) supplying water to the reservoir of the system;
    (c) supplying electrical power to the cathode and anode of the cells of the system to produce hydrogen gas and oxygen gas;
    (d) supplying the produced hydrogen gas to the intake manifold of the vehicle and venting the produced oxygen gas to atmosphere; and
    (e) pumping the collected water back into the reservoir of the system.

* * * * *